Patented Apr. 9, 1940

2,196,584

UNITED STATES PATENT OFFICE 2,196,584

MANUFACTURE OF FERRIC SULPHATE

Austin G. Edison, Ardentown, Del., assignor to E. I. du Pont de Nemours & Company, Wilmington, Del., a corporation of Delaware No Drawing. Application June 9, 1937, Serial No. 147,250

3 Claims. (Cl. 23—126)

This invention relates to processes for producing ferric sulphate, and is particularly directed to processes comprising slurrying ferrous sulphate in a sulphuric acid solution, oxidizing the ferrous sulphate with nitric acid at a temperature above about 60° C. to give ferric sulphate and to evolve lower oxides of nitrogen, recovering the lower oxides, oxidizing them with an oxygen-containing gas to give higher oxides of nitrogen, and absorbing the higher oxides in water under superatmospheric pressure to regenerate nitric acid.

Ferrous sulphate is the chief constituent of many industrial waste products. It is obtained in considerable quantities as a by-product in pigment manufacture, as, for instance, in the production of titanium oxides. An acidic solution of ferrous sulphate is the waste-product resulting when iron and steel are pickled in sulphuric acid to remove rust and scale. A considerable amount of the by-product ferrous sulphate from these various operations is recovered and sold in the chemicals trade as copperas crystals, $FeSO_4 \cdot 7H_2O$.

The potential supply of copperas is so large and its price is so low that its recovery is frequently an unprofitable operation. In fact, the disposal of by-product ferrous sulphate presents a difficult problem in many instances. It has been customary to run such wastes into a convenient stream, but where stream-pollution must now be avoided, this method of disposal is no longer possible.

It has been proposed to dispose of ferrous sulphate by oxidizing it to ferric sulphate, a product of many uses. Ferric sulphate has found commercial application as a flocculent in water purification, as a sewage coagulant, as a disinfectant, as a mordant in the black-dyeing of wool, in the manufacture of iron alum and Prussian blue, in leaching copper ores, and in a wide variety of other uses. A process for converting ferrous sulphate to ferric sulphate at low cost would provide a convenient outlet for considerable amounts of ferrous sulphate.

Numerous methods have been suggested for oxidizing ferrous sulphate. It has been proposed, for example, to bubble air through a ferrous sulphate solution. Elevated temperatures and pressures, and various catalysts have been employed in attempts to obtain a satisfactory rate of oxidation by means of air. Processes wherein air is used as the oxidizing agent have not proved successful, owing to incomplete conversion of ferrous sulphate to ferric sulphate, and to the slow rate at which the oxidation takes place.

Chlorine has been employed as an oxidizing agent for ferrous sulphate, and a product known as chlorinated copperas has found some commercial application, but the cost of the chlorine used makes this product relatively expensive.

Another proposed method for oxidizing ferrous sulphate consists in bubbling a mixture of sulphur dioxide and air through a ferrous sulphate solution, the reaction proceeding according to the equations:

(1) 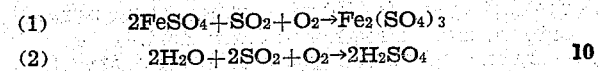  $2FeSO_4 + SO_2 + O_2 \rightarrow Fe_2(SO_4)_3$ (2) $2H_2O + 2SO_2 + O_2 \rightarrow 2H_2SO_4$ Owing to the formation of sulphuric acid simultaneously with ferric sulphate, this process has found some application in uses where the free sulphuric acid is beneficial, as in leaching copper ores. In general, none of the above processes have been found capable of giving a ferric sulphate of high purity at low cost.

The most satisfactory method heretofore available for producing ferric sulphate by oxidation of ferrous sulphate has been a process wherein nitric acid is used as the oxidizing agent in the presence of sulphuric acid, the reaction following the equation:

(3) 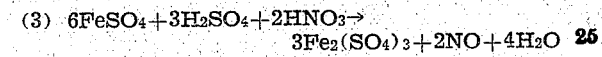 $6FeSO_4 + 3H_2SO_4 + 2HNO_3 \rightarrow$
$3Fe_2(SO_4)_3 + 2NO + 4H_2O$ By this process a relatively rapid oxidation of ferrous sulphate has been attained.

In order to secure complete oxidation at a satisfactory rate, even by means of nitric acid, it has heretofore been necessary to employ an amount of nitric acid considerably in excess of the stoichiometric proportion indicated by the above equation.

Not only does the use of excess nitric acid increase the cost of operation, but also elimination of the excess acid from the product during crystallization and drying constitutes a difficult problem. There is danger also that appreciable amounts of ferric nitrate may contaminate the product when excess nitric acid is used. If, on the other hand, an excess of nitric acid is not used in the processes heretofore known to the art, the oxidation of ferrous sulphate proceeds at an unsatisfactory rate and conversion to ferric sulphate is normally incomplete.

It has also been proposed to bubble air through a solution or suspension of copperas crystals in the presence of sulphuric acid, using oxides of nitrogen to catalyze the oxidation of the copperas. To render such a process economically feasible it is necessary to employ a closed system and recirculate the nitric oxides. When recirculation is practiced, the gas in the system soon becomes over-burdened with the free nitrogen which enters with the air employed for the oxidation.

In order to recover the oxides of nitrogen and to purge the system of free nitrogen, the mixture of these gases may be passed through a solution or suspension of lime or calcium carbonate. The nitrogen oxides react to form calcium salts, whereas the free nitrogen passes through and is released. From the calcium salts thus formed, the nitrogen oxides are regenerated by heating with sulphuric acid.

The expense of the lime and sulphuric acid makes this system of nitrogen oxide recovery economically unattractive. The difficulty of economically recovering the evolved nitrogen oxide has, therefore, tended to restrict the application of processes wherein ferrous sulphate is oxidized by air in the presence of nitric oxide as a catalyst.

I have found that ferrous sulphate can be rapidly, completely, and economically oxidized by slurrying it in a sulphuric acid solution, oxidizing it with nitric acid at a temperature above about 60° C. to give ferric sulphate and to evolve lower oxides of nitrogen, recovering the lower oxides, oxidizing them with an oxygen-containing gas to give higher oxides of nitrogen and absorbing the higher oxides under superatmospheric pressure in water to regenerate nitric acid.

By oxidizing a slurry of ferrous sulphate with nitric acid according to the processes of my invention, a much higher rate of oxidation is secured than if a solution of ferrous sulphate is used. A further advantage obtained by starting with a slurry of ferrous sulphate is that the evaporation required for concentrating and crystallizing the ferric sulphate product is held to a minimum.

By the processes of my invention, rapid and complete oxidation of ferrous sulphate may be attained without the use of an excess of nitric acid over the stoichiometric proportions indicated by the Equation 3 above. The ferric sulphate formed is therefore substantially free from contamination by ferric nitrate. By avoiding excess nitric acid, crystallization and drying of the ferric sulphate are facilitated.

The nitric oxide (NO) formed in the operation of my novel processes may be directly recovered as nitric acid. Since this nitric oxide is not diluted with free nitrogen or any other inert gas, expensive purging operations are avoided. It is, moreover, unnecessary to absorb this nitric oxide in a basic material, such as a lime slurry, and regenerate nitric acid by treatment with sulphuric acid.

Instead of such indirect and uneconomical methods, a process for directly recovering nitric oxide, such as is employed in making nitric acid by oxidation of ammonia, may be used in my novel processes. The nitric oxide is oxidized to nitrogen tetraoxide ($NO_2$) by contact with air or other gases containing oxygen, and the nitrogen tetraoxide is absorbed in water, the reactions following the equations:

(4) $\qquad 2NO + O_2 \rightarrow 2NO_2$
(5) $\qquad 3NO_2 + H_2O \rightarrow 2HNO_3 + NO$ or (6) $\qquad 4NO + 3O_2 + 2H_2O \rightarrow 4HNO_3$ In the practical operation of this method of nitric oxide recovery, the nitric oxide and air are introduced at elevated pressures into the bottom of an absorption tower filled with a suitable packing. Water is admitted at the top of the tower and trickles down over the packing. The nitric oxide first reacts with the oxygen of the air to form nitrogen tetraoxide, which is then absorbed in the descending stream of water. Nitric acid is drawn off at the bottom of the tower while the free nitrogen from the air is vented off at the top of the tower.

Such an acid recovery system is readily adaptable to my novel processes for producing ferric sulphate. Since in this manner I am able to recover at least ninety per cent of the nitric acid originally used for oxidizing the ferrous sulphate, the processes of my invention are very economical to operate.

In the following illustrative example there is shown the increased rate of oxidation which I am able to secure by starting with a slurry of ferrous sulphate instead of a saturated ferrous sulphate solution, even when the reaction is carried out at normal atmospheric pressure. The example also shows the necessity of carrying out the oxidation at temperatures above about 60° C.

*Example I*

A slurry of ferrous sulphate was made by mixing 3120 parts by weight of slightly over-dried copperas ($FeSO_4 \cdot 7H_2O$) with 600 parts by weight of water. The mixture was heated to 65° C. and 615 parts by weight of concentrated sulphuric acid (96% $H_2SO_4$) was added, the mixture becoming thin enough at this point to permit stirring. The temperature was raised to about 95° C. and maintained at this point while 460 parts by weight of nitric acid (60% $HNO_3$) was added over a period of one and one-half hours. Toward the end of the reaction the mixture became thick and viscous, and the rate of nitric acid addition was limited by the rate at which the oxides of nitrogen could escape.

The quantities of reactants used were essentially the stoichiometric equivalents calculated from the Equation 3 given above.

Analysis of the product made immediately after the nitric acid had been added showed that the ferrous sulphate was completely oxidized, and that a negligible amount of ferric nitrate was formed, indicating that the reaction followed the theoretical equation. Analysis of the evolved gases showed that not more than 0.15% by volume of the nitric oxide (NO) was degraded to nitrous oxide ($N_2O$) or nitrogen ($N_2$).

The procedure described above was repeated, duplicating all conditions except that enough water was used to give a saturated solution rather than a slurry of ferrous sulphate before addition of the nitric acid. In this case it was found possible to add all of the nitric acid in a period of ten minutes, but an additional period of nine hours was required before oxidation of the ferrous sulphate was complete. The advantage of starting with a slurry rather than a solution of copperas is readily apparent from this experiment.

The necessity of using a reaction temperature above 60° C. was shown by oxidizing a slurry of copperas with nitric acid in the presence of sulphuric acid, employing the stoichiometric proportions of reactants as above, but maintaining the temperature of the mixture at about 60° C. during and following the nitric acid addition. It was found impossible to obtain a satisfactory product of ferric sulphate under these conditions, but instead, a complex containing $FeSO_4$ and NO was formed.

In the following example it is shown that ferric sulphate may readily be produced from ferrous sulphate by oxidation under elevated pressure with nitric acid according to a process of my invention.

Example II

In an autoclave equipped with a mechanical stirrer, a slurry of ferrous sulphate was made by mixing 556 parts by weight of copperas ($FeSO_4.7H_2O$) with 200 parts by weight of water. The slurry was heated to 50° C. and 102 parts by weight of concentrated sulphuric acid was added. Entrapped air was swept out of the autoclave by passing pure nitrogen through it under atmospheric pressure. The autoclave was then closed.

Sixty parts by weight of concentrated nitric acid was introduced into the autoclave over a period of 1 hour the mixture being agitated and the pressure permitted to build up during this addition. In one hour the gage pressure had increased to 115 lbs./sq. in. Nitric oxide was bled out as necessary to maintain the gage pressure at about 105 lbs./sq. in.

The temperature of the mixture in the autoclave was increased to 100° C. and maintained at this point for three hours. At the end of this three hour period the pressure was slowly released and the autoclave was opened. Analysis of the ferric sulphate formed showed that oxidation of the iron had been substantially complete.

Example II therefore shows that oxidation of ferrous sulphate by nitric acid may satisfactorily be accomplished by starting with a slurry of ferrous sulphate and carrying out the reaction under elevated pressure.

When nitric oxide is evolved under a pressure of about 100 lbs. (gage) per sq. in., as in Example II, it can be recovered economically and directly, as nitric acid, by oxidation to nitrogen tetraoxide and absorption of this nitrogen tetraoxide in water. The optimum conditions for the recovery of nitric oxide as nitric acid have been well established in connection with the production of nitric acid by oxidation of ammonia. One of these optimum conditions is the use of elevated pressures during the oxidation and absorption of the nitric oxide. By carrying out the oxidation of ferrous sulphate with nitric acid at elevated pressure I can, in the processes of my invention, recover the evolved nitric oxide directly, in a system such as is used for absorbing the products of ammonia oxidation.

By my novel processes, wherein a slurry of ferrous sulphate is oxidized with nitric acid in the presence of sulphuric acid at elevated pressure and temperature and with separate recovery of the evolved oxides of nitrogen as nitric acid, I have, therefore, provided a rapid, economical process for producing ferric sulphate of good quality at low cost.

It will be understood that a considerable variation from the specific conditions described in the above examples may be adopted without departing from the scope of my invention.

The quantities of sulphuric acid and nitric acid used may be considerably in excess of the amounts theoretically required to convert the ferrous sulphate present to ferric sulphate. Such excess amounts of sulphuric and nitric are unnecessary and add to the cost of the finished product. The stoichiometric proportions of the above examples represent the most economical amounts to use and are to be preferred.

The proportions of water and ferrous sulphate may be varied considerably. As little water should be used as will serve to make the reaction mass stirrable at all times, since an excess over this amount ultimately would have to be removed by evaporation. The amount of water used should not, in any event, be so large as to effect complete solution of the ferrous sulphate. The proportions of water and ferrous sulphate shown in the above examples provided a satisfactory ratio and resulted in the production of a ferric sulphate liquor requiring a minimum of concentrating by evaporation.

The sulphuric and nitric acids used should be of such concentrations that they do not cause objectionable dilution of the reaction mixture. The dilution effect caused by using dilute acids may be offset by reducing or eliminating the amount of water used in making the initial slurry of ferrous sulphate.

As has been shown in Example I, the oxidation of ferrous sulphate by a process of my invention is carried out at a temperature above about 60° C., since below 60° C. a complex compound is formed which contains both $FeSO_4$ and NO. As a practical matter, temperatures in the range from about 70° C. to about 100° C. may be used conveniently under atmospheric pressure, and temperatures above about 100° C. may be used when the reaction is carried out under superatmospheric pressures.

Oxidation of ferrous sulphate by nitric acid under super-atmospheric pressure, as illustrated by Example II, has been shown to proceed satisfactorily. The nitric oxide evolved by this reaction is recovered directly as nitric acid. In the preferred embodiment of my invention both the oxidation of ferrous sulphate and the recovery of nitric acid are carried out under super-atmospheric pressure, but the oxidation could be carried out at atmospheric pressure by providing means for introducing the nitric oxide gas to the nitric acid recovery system under the necessary pressure.

I claim:

1. In a process for producing ferric sulphate, the steps comprising slurrying ferrous sulphate in a sulphuric acid solution to make a slurry containing no substantial excess of water over that required to make the slurry at all times fluid enough to stir and oxidizing the ferrous sulphate in said slurry with nitric acid.

2. In a process for producing ferric sulphate, the steps comprising slurrying ferrous sulphate in a sulphuric acid solution to make a slurry containing no substantial excess of water over that required to make the slurry at all times fluid enough to stir and oxidizing the ferrous sulphate in said slurry with nitric acid at a temperature above about 60° C.

3. In a process for producing ferric sulphate, the steps comprising slurrying ferrous sulphate in a sulphuric acid solution to make a slurry containing no substantial excess of water over that required to make the slurry at all times fluid enough to stir, oxidizing the ferrous sulphate in said slurry with nitric acid at a temperature above about 60° C. and at a superatmospheric pressure, oxidizing nitrogen oxides evolved under pressure, and absorbing said oxidized nitrogen oxides in water to form nitric acid, the said superatmospheric pressure used in oxidizing the ferrous sulphate being substantially the same as the pressure used in oxidizing the nitrogen oxides.

AUSTIN G. EDISON.